(12) United States Patent
Heide et al.

(10) Patent No.: US 9,878,338 B2
(45) Date of Patent: Jan. 30, 2018

(54) BACKPACK SPRAYER AND CONTAINER FOR SPRAYING AGENT FOR A BACKPACK SPRAYER

(71) Applicant: Andreas Stihl AG & Co. KG, Waiblingen (DE)

(72) Inventors: Klaas Maximilian Heide, Oldenburg/Holstein (DE); Hans-Georg Wiedmann, Backnang (DE); Klaus Langhans, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 270 days.

(21) Appl. No.: 14/792,013

(22) Filed: Jul. 6, 2015

(65) Prior Publication Data
US 2016/0001310 A1    Jan. 7, 2016

(30) Foreign Application Priority Data

Jul. 3, 2014 (DE) ......................... 10 2014 009 838

(51) Int. Cl.
| | |
|---|---|
| B05B 7/14 | (2006.01) |
| B05B 7/24 | (2006.01) |
| A01M 7/00 | (2006.01) |
| A01M 9/00 | (2006.01) |
| B65D 43/16 | (2006.01) |
| B65D 45/20 | (2006.01) |

(52) U.S. Cl.
CPC ......... B05B 7/2475 (2013.01); A01M 7/0021 (2013.01); A01M 7/0085 (2013.01);
(Continued)

(58) Field of Classification Search
CPC ... B05B 7/1413; B05B 7/1427; B05B 7/2475; B05B 9/08; A01M 7/0017;
(Continued)

(56) References Cited

U.S. PATENT DOCUMENTS

| | | | | |
|---|---|---|---|---|
| 1,959,782 A | * | 5/1934 | Fenwick, Jr. ............ | A62C 8/02 224/148.2 |
| 2,162,057 A | * | 6/1939 | Brandt ................... | B05B 9/0877 239/154 |

(Continued)

FOREIGN PATENT DOCUMENTS

| | | |
|---|---|---|
| DE | 10 2007 023 409 A1 | 11/2008 |
| EP | 2 135 816 A1 | 12/2009 |
| EP | 2923570 A1 | 9/2015 |

*Primary Examiner* — Darren W Gorman
(74) *Attorney, Agent, or Firm* — Walter Ottesen, P.A.

(57) ABSTRACT

A backpack sprayer has a carrying arrangement, on which a container for spraying agent is arranged. The container has a filling opening which can be closed by way of a lid. The carrying arrangement has a set-down position, in which the carrying arrangement is set down on a planar, horizontal set-down surface. The spraying agent region of the container is the region which is provided for spraying agent and extends as far as a maximum permissible filling height (max). The spraying agent region has a greatest horizontal inner cross-sectional area (A) in the set-down position. In order to allow simple filling of spraying agent and simple cleaning of the container, it is provided that the container can be opened at the filling opening over at least 60% of its greatest inner cross-sectional area (A).

20 Claims, 7 Drawing Sheets

(52) U.S. Cl.
CPC ........ *A01M 9/0046* (2013.01); *A01M 9/0084* (2013.01); *B05B 7/1427* (2013.01)

(58) Field of Classification Search
CPC .............. A01M 7/0021; A01M 7/0046; A01M 7/0085; A01M 9/0038; A01M 9/0046; A01M 9/0084; B65D 43/16; B65D 45/04; B65D 45/16; B65D 45/20
USPC .................................................. 239/152–154
See application file for complete search history.

(56) References Cited

U.S. PATENT DOCUMENTS

| | | | | |
|---|---|---|---|---|
| 2,692,799 A | * | 10/1954 | Parrott | A01M 7/005 239/152 |
| 2,719,753 A | * | 10/1955 | Parrott | A01M 7/0053 239/152 |
| 2,752,200 A | * | 6/1956 | Santarelli | B05B 9/0426 222/175 |
| 4,658,778 A | * | 4/1987 | Gamoh | B05B 7/1413 123/195 C |
| 5,133,300 A | * | 7/1992 | Miura | B05B 7/2416 123/2 |
| 5,248,089 A | * | 9/1993 | Bekius | B05B 9/08 222/175 |
| 5,622,056 A | * | 4/1997 | Utter | B05B 9/0838 239/152 |
| 6,089,477 A | | 7/2000 | Dillon | |
| 8,066,206 B1 | * | 11/2011 | Cotham | A01C 7/02 224/576 |
| 2007/0034710 A1 | | 2/2007 | Elrod et al. | |

* cited by examiner

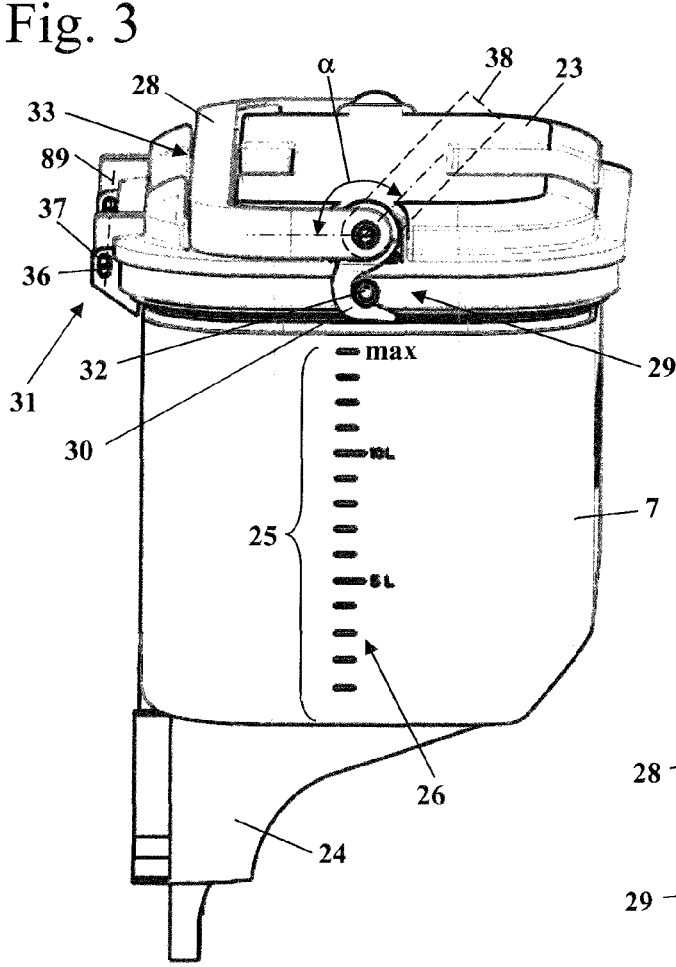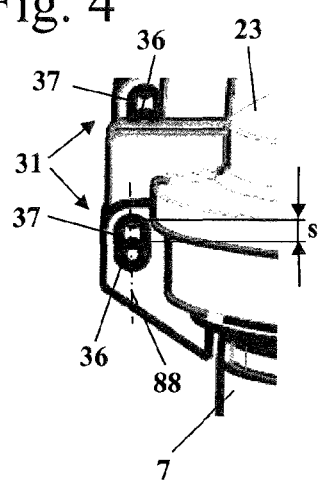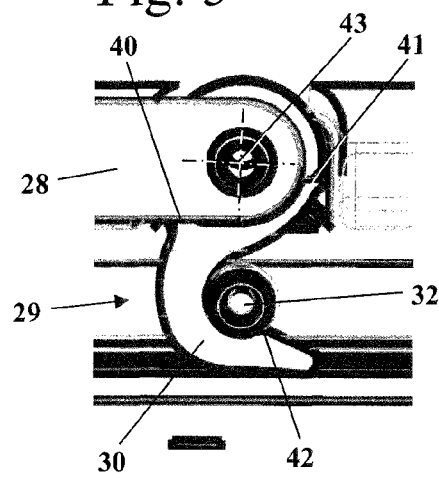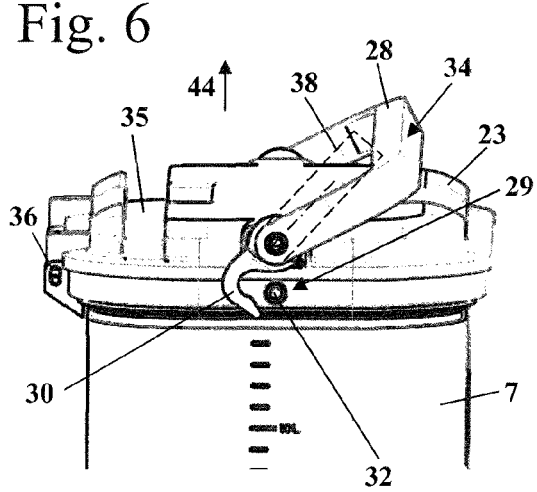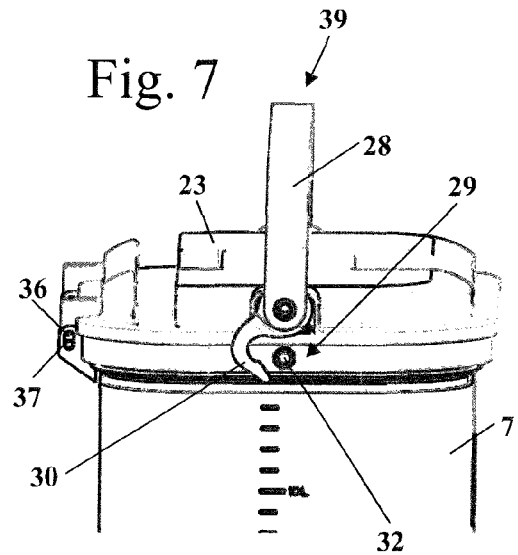

BACKPACK SPRAYER AND CONTAINER FOR SPRAYING AGENT FOR A BACKPACK SPRAYER

CROSS REFERENCE TO RELATED APPLICATION

This application claims priority of German patent application no. 10 2014 009 838.9, filed Jul. 3, 2014, the entire content of which is incorporated herein by reference.

BACKGROUND OF THE INVENTION

DE 10 2007 023 409 A1 has disclosed a backpack sprayer having a container for spraying agent. The container for spraying agent is configured as a blow-molded part and has an approximately rectangular cross section. A screw lid which is placed onto a round filling opening is arranged on the upper side of the container. The cross-sectional area of the filling opening is considerably smaller than the greatest inner cross-sectional area of the container for spraying agent. In customary containers for spraying agent having a screw lid, the area of the filling opening is considerably smaller than 50% of the greatest horizontal inner cross-sectional area of the container. The filling of spraying agent and the cleaning of the container can be made difficult as a result.

SUMMARY OF THE INVENTION

It is an object of the invention to provide a backpack sprayer of the generic type, in which spraying agent can be filled simply into the container and which permits simple cleaning of the container. It is a further object of the invention to provide a container for spraying agent for a backpack sprayer, which container permits simple filling of spraying agent and simple container cleaning.

The back carried spray apparatus of the invention includes: a container for spraying agent; the container having a fill opening; a cover configured to close the fill opening; the back carried spray apparatus defining a rest position wherein the spray apparatus is placed on an even horizontal rest surface; the container having a spray agent region extending up to a maximum allowable fill height; the spray agent region defining a greatest horizontal inner cross-sectional area (A) in the rest position; and, the container being configured to open over at least 60% of the greatest horizontal inner cross-sectional area (A) at the fill opening.

In order to permit simple filling of spraying agent and simple cleaning of the container, it is provided that the container can be opened at the filling opening over at least 60% of its greatest inner cross-sectional area. Here, the greatest inner cross-sectional area is the greatest horizontal inner cross-sectional area of the container in the set-down position of the sprayer in a spraying agent region. The spraying agent region is that region of the container which is provided for spraying agent and which extends as far as a maximum permissible filling height of the container. Accordingly, the greatest horizontal inner cross-sectional area is the greatest area of the liquid surface when the container is filled from the empty state as far as the maximum permissible filling height in the set-down position of the sprayer.

The filling of the container is comparatively simple by virtue of the fact that the container can be opened at the filling opening over at least 60% of its greatest inner cross-sectional area. During cleaning of the container, a user can readily reach all regions, and all regions of the spraying agent container are readily visible for the operator. The container can preferably be opened at the filling opening over at least 90% of its greatest inner cross-sectional area. The container can particularly advantageously be opened at the filling opening over its entire greatest inner cross-sectional area. This results in a very large filling opening. The emptying of the container is also simplified, since the container only has to be tilted by approximately 90° from a position, in which the filling opening is arranged horizontally, and not by virtually 180° as in the case of known spraying agent containers with a small, round filling opening.

The filling opening advantageously has a non-round cross section. In the case of the known round screw lids, the size of the filling opening is limited by the depth of the container, that is, the extent of the container perpendicularly with respect to the plane of a back carrying plate of a back carrier or in the direction from the back of the user to the rear. A non-round cross section of the filling opening permits a considerably larger filling opening. If, in particular, the container can be opened at the filling opening over its entire greatest inner cross-sectional area, the container can be manufactured in a different manufacturing method than the blow-molding method which has usually been used up to now for containers for spraying agent, namely in an injection-molding method, for example. This results in greater degrees of freedom for the configuration of the container.

In order to permit simple and rapid fixing of the lid to the container, it is provided that the sprayer has a locking apparatus for fixing the lid on the container. Here, the locking apparatus includes a pivotably mounted locking element and an actuating element, the locking element bringing about the locking action, and it being possible for the locking apparatus to be released and to be locked by way of pivoting of the actuating element. As a result, the container lid can be fixed to the container or released from the latter in a simple way by way of pivoting of the actuating element. The actuating element is advantageously pivotable with respect to the locking element. As a result, the position of the actuating element can be decoupled partially from the position of the locking element. The angle, about which the actuating element can be pivoted with respect to the locking element, is advantageously at least approximately 30°, preferably more than approximately 60°. The actuating element preferably has a first end position, in which the locking apparatus is closed, and a second end position, in which the locking apparatus is open. This makes simple operation possible. If the actuating element is arranged in one of its end positions, the operator can see directly whether the locking apparatus is closed or open.

The container advantageously includes a pivotably mounted carrying handle which forms the actuating element. The carrying handle advantageously has a carrying position which lies in the pivoting path between the first end position and the second end position. In the carrying position, the container can advantageously be carried by way of the carrying handle. The carrying handle advantageously acts on the locking element in the pivoting path from one end position into the other end position only after the carrying position has been pivoted past. As a result, the locking apparatus can be both open and closed in the carrying position of the carrying handle. If the locking apparatus is closed, the container can be carried using the carrying handle. If the locking apparatus is open, the lid can be simply removed or pivoted away by the operator in the carrying position of the carrying handle. The carrying handle advantageously lies at least partially in a depression of the lid in the first end position. As a result, the carrying handle does not protrude or only protrudes a little beyond the outer contour of the lid in operation. It is readily visible to the operator that the lid is closed. The carrying handle is protected against unintentional actuation.

The lid is advantageously mounted pivotably on the container by way of at least one pivoting bearing. Here, the pivoting bearing is advantageously configured in such a way that it permits a translational movement of the lid perpendicularly with respect to the filling opening. As a result, reliable closure of the lid can be ensured. However, it can also be provided that the lid can be removed from the container.

A seal advantageously acts between the lid and the container, which seal is arranged in a receiving space which is formed between the lid and the container when the lid is closed. The translational movement of the lid perpendicularly with respect to the filling opening during closure of the locking apparatus advantageously brings about contact of at least one sealing face of the seal with the container. The translational movement can ensure a sufficient actuating path for the seal. A reliable sealing action can also be achieved in the regions of the seal which are arranged adjacently with respect to the pivot axis of the pivoting bearing. During the translational movement of the lid, the lid advantageously moves by at least approximately 1 mm, preferably by at least approximately 3 mm, in particular by at least approximately 5 mm.

In the closed state of the lid, the seal is advantageously supported by way of a radial sealing face on an edge of the container, which edge delimits the receiving space toward the outer side of the container. Here, the radial sealing face is a sealing face which acts to the outside, that is, parallel to the plane of the filling opening. An axial sealing face is advantageously additionally provided on the seal. A particularly reliable sealing action is achieved by virtue of the fact that the seal has both at least one axial sealing face and at least one radial sealing face. The seal is advantageously held on the lid. The seal is supported, in particular, by way of the axial sealing face on a circumferential edge of the container, which edge falls away as far as the container interior. Spraying agent which was arranged in the region of the edge can run off into the container interior by virtue of the fact that the circumferential edge falls away as far as the container interior. It can be provided that the seal additionally moves the spraying agent into the container interior and in the process cleans the edge of spraying agent.

The seal is advantageously of strip-shaped configuration. On the axial sealing face, the width of the seal is advantageously less than approximately 40% of the overall height of the seal in the non-loaded state. In particular, on the axial sealing face, the width of the seal is less than approximately 30% of the overall height of the seal in the non-loaded state. As a result of the comparatively narrow, high configuration of the seal, the seal can already be deformed with a low force, with the result that the seal curves outward and brings about the radial sealing action as a result. A curvature of the seal toward the inside can also be advantageous if a radially inner sealing face is provided. Here, the terms "axial" and "radial" relate to the direction, in which the lid is moved during closure of the locking apparatus. "Axial" means parallel to the movement direction of the lid and "radial" means perpendicularly with respect to the movement direction of the lid. The lid advantageously has an edge which delimits the receiving space for the seal toward the container interior. By virtue of the fact that the boundary toward the container interior is arranged on the lid, the container can be configured in such a way that spraying agent which is arranged on the edge can flow away into the container interior in an unimpeded manner. A simple configuration arises if the seal is configured as a circumferential sealing strip, the height of which is at least approximately 2 cm in the non-loaded state. The height of the seal in the non-loaded state is advantageously at least approximately 3 cm. A satisfactory sealing action and sufficient deformation can be ensured as a result.

A fastening arrangement for fixing to a back carrier of the carrying arrangement is advantageously formed integrally on the container. A simple construction with few individual parts results from the fact that the fastening arrangement is not configured as a separate component, but rather is formed integrally on the container. The container is advantageously an injection-molded part. As a result, a container with a large filling opening can be manufactured in a simple way. The fastening arrangement for fixing to the back carrier can be injection-molded on the container simply in one working step. Here, the container is advantageously made of plastic.

For a container for spraying agent for a backpack sprayer, the container having a filling opening which can be closed by way of a lid, the container having a spraying agent region which is provided for spraying agent and extends as far as a maximum permissible filling height, and the spraying agent region having a greatest, horizontal inner cross-sectional area in a set-down position of the sprayer, it is provided that the container can be opened at the filling opening over at least 60% of its greatest inner cross-sectional area.

BRIEF DESCRIPTION OF THE DRAWINGS

The invention will now be described with reference to the drawings wherein:

FIG. 3 is a perspective illustration of the container of the sprayer from FIG. 1;

FIG. 4 is an enlarged illustration of the pivoting bearing from FIG. 3;

FIG. 5 is an enlarged illustration of the locking apparatus from FIG. 3;

FIG. 6 shows the container from FIG. 3 in a perspective illustration with an open locking apparatus;

FIG. 7 shows the container from FIG. 6 in a perspective illustration with an open locking apparatus in the carrying position of the carrying handle;

DESCRIPTION OF THE PREFERRED
EMBODIMENTS OF THE INVENTION

Figure 1:
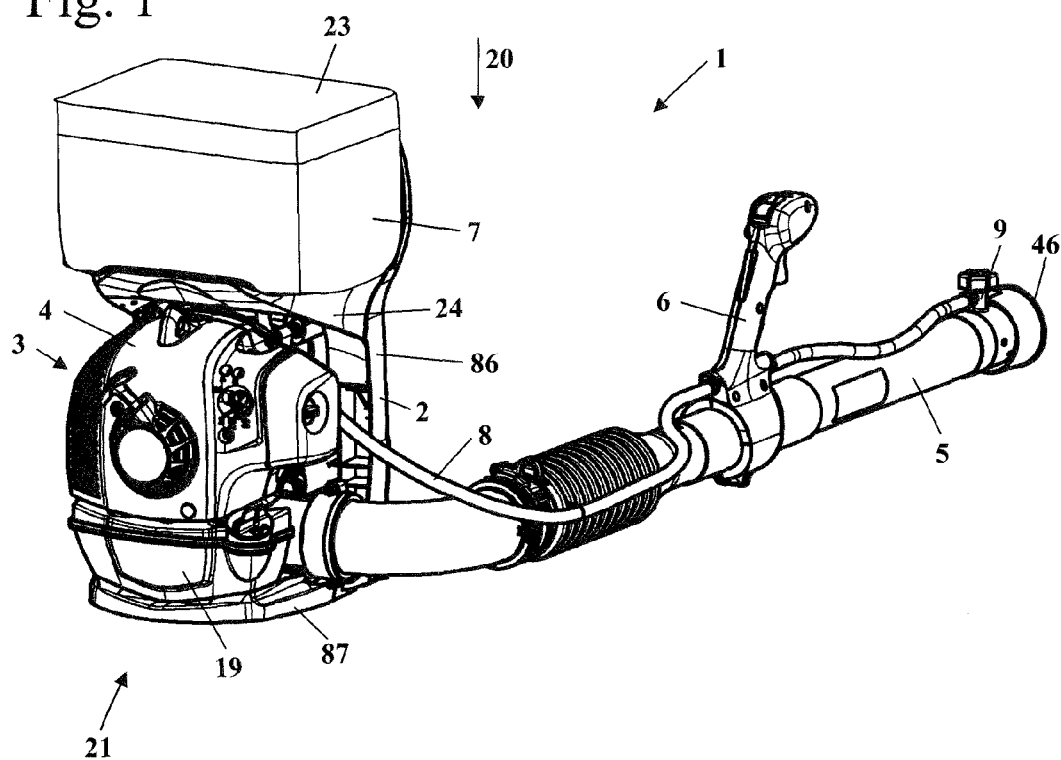
FIG. 1 is a diagrammatic, perspective illustration of the sprayer.

FIG. 1 diagrammatically shows a sprayer 1. The sprayer 1 serves to discharge liquid or pulverulent spraying agents. The sprayer 1 has a back carrier 2 on which a blower unit 3 is held. The blower unit 3 has a housing 4. Moreover, a fuel tank 19 is arranged on the back carrier 2, which fuel tank 19 supplies fuel to a drive engine which is arranged in the housing 4. The blower unit 3 delivers an air flow through a blower pipe 5, which air flow leaves the blower pipe 5 at a discharge opening 46. A container 7 for spraying agent is held via a carrier 24 on the back carrier 2. It is provided for the discharge of liquid spraying agents that a spraying agent line 8 leads out of the container 7, which spraying agent line 8 opens into the blower pipe 5 at a metering valve 9 adjacently with respect to the discharge opening 46 and feeds spraying agent into the air flow conveyed through the blower pipe 5. Pulverulent spraying agents, that is, dustable powders, are advantageously fed directly into a fan spiral 18 (FIG. 2) of the blower unit 3. The back carrier 2 has a back plate 86 which is arranged on the back of an operator during operation, and a base plate 87, on which the tank 19 is fixed. The base plate 87 protrudes approximately perpendicularly to the rear from the lower region of the back plate 86. The blower unit 3 is advantageously supported via vibration damping elements on the base plate 87 and/or on the back plate 86.

Figure 2:
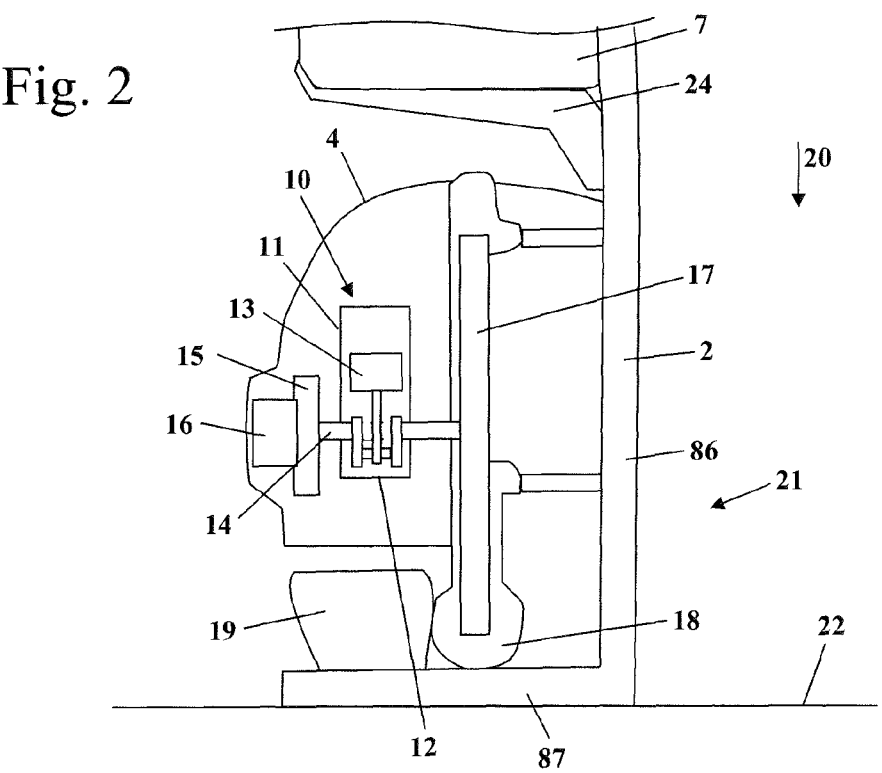
FIG. 2 shows a diagrammatic section through the sprayer from FIG. 1.

FIGS. 1 and 2 show the sprayer 1 in a set-down position 21, in which the sprayer 1 stands with the base plate 87 of the back carrier 2 on a horizontal, planar set-down surface 22. As FIG. 2 shows, the container 7 is arranged above the housing 4 in relation to the direction of action 20 of gravity. FIG. 2 diagrammatically shows the drive engine 10 which is arranged in the housing 4. In the embodiment, the drive engine 10 is an internal combustion engine. However, the drive engine 10 can also be an electric motor. The drive engine 10 has a cylinder 11, in which a piston 13 is mounted such that it can move to and fro. The piston 13 rotationally drives a crankshaft 14 which is mounted rotatably in a crankcase 12. A fan wheel 17 is connected fixedly to the crankshaft 14 so as to rotate with it on that side of the drive engine 10 which faces the back plate 86. The fan wheel 17 delivers an air flow through a fan spiral 18 and into the blower pipe 5 which adjoins the fan spiral 18 (FIG. 1). In the embodiment, an impeller wheel 15 for delivering cooling air for the drive engine 10 is fixed to the crankshaft 14 on that side of the drive engine 10 which lies opposite the fan wheel 17. As an alternative, the cooling can also take place by way of an air flow which is delivered by the fan wheel 17 and is branched off from the blower air flow. Instead of an impeller wheel 15, a flywheel can then be provided for generating the ignition energy. A starting apparatus 16 for the drive engine 10 is arranged on that side of the impeller wheel 15 which faces away from the drive engine 10. The starting apparatus 16 can be a manually actuable pull starter or an electric starting apparatus.

As FIG. 1 shows, a handle 6 for guiding the blower pipe 5 during operation is fixed to the blower pipe 5. The handle 6 can have operating elements for operating the drive engine 10.

FIG. 3 shows the container 7 with a lid 23 arranged thereon. The container 7 has a spraying agent region 25 which extends as far as a maximum permissible filling height max. The spraying agent region 25 is the region, into which spraying agent may be filled by the operator, that is, which is provided for spraying agent. Filling is not permissible beyond the maximum permissible filling height max. The region which lies above the maximum permissible filling height max in the set-down position 21 therefore does not belong to the spraying agent region 25. In the embodiment, the container 7 has a scale 26 on its outer side, which scale 26 indicates to the operator how much spraying agent is filled and where the maximum permissible filling height max is situated.

The lid 23 is mounted pivotably on the container 7 via a pivoting bearing 31 which is shown on an enlarged scale in FIG. 4. The pivoting bearing 31 includes two bearing pins 36 which are held pivotably in each case in a slot 37. The slots 37 have a longitudinal direction 88 which lies perpendicularly with respect to the pivot axis 89 (FIG. 3) of the lid 23. On account of the slots 37, the lid 23 can be moved in the longitudinal direction 88 by a limited travel. The travel (s), by which the lid 23 can be displaced in the longitudinal direction 88 with respect to the container 7, is advantageously at least approximately 1 mm, in particular at least approximately 3 mm, preferably at least approximately 5 mm.

As FIGS. 3 and 5 show, the lid 23 is fixed to the container 7 via a locking apparatus 29. The locking apparatus 29 includes a carrying handle 28 which serves to actuate the locking apparatus 29, and a locking element 30. In the embodiment, two locking elements 30 are arranged on opposite sides of the container 7. Each locking element 30 interacts with one end of the carrying handle 28. The locking elements 30 are of hook-shaped configuration and interact with locking pins 32 which are fixed to the container 7. The supporting handle 28 and each locking element 30 are held on the lid 23 such that they can be pivoted about a common pivot axis 43 (FIG. 5). The locking pins 32 are fixed to the container 7, in particular are configured in one piece with the container 7.

The carrying handle 28 is shown in a first end position 33 in FIG. 3. The locking apparatus 29 is closed in this end position. In the set-down position 21, the pivot axis 43 is arranged above the locking pin 32. In this position, the locking element 30 engages below the locking pin 32 and fixes the lid 23 to the container 7 as a result. As FIG. 5 also shows, the locking element 30 has a latching elevation 42 which latches under the locking pin 32. A reliable locking action is ensured as a result. The carrying handle 28 can be moved out of the first end position 33 (shown in FIG. 3) as far as into an intermediate position 38, without acting on the locking element 30. The locking element 30 remains in its locked position during the pivoting of the carrying handle 28 out of the first end position 33 into the intermediate position 38. The angle α, by which the carrying handle 28 can be pivoted with respect to the locking element 30, is advantageously at least approximately 90°, in particular more than 110°. In the embodiment, the angle α is greater than 130°. As FIG. 5 shows, the locking element 30 has a first driving stop 40 and a second driving stop 41. In the end position 33 which is shown in FIG. 3, the carrying handle 28 bears against the first driving stop 40. The carrying handle 28 can be pivoted with respect to the locking element 30 until the carrying handle 28 bears against the second driving stop 41. As a result, the carrying handle 28 can be set into the carrying position 39 (shown in FIG. 7), in which the carrying handle 28 protrudes perpendicularly upward, without releasing the locking apparatus 29. The carrying handle 28 reaches the intermediate position 38 only after pivoting past the carrying position 39.

Figure 12:
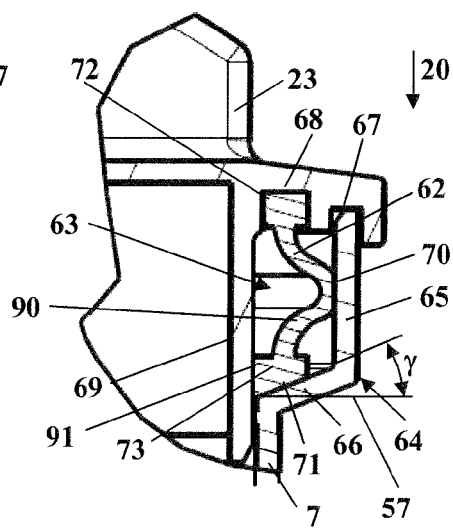
FIG. 12 shows the detail XII from FIG. 11 in an enlarged illustration.

FIG. 6 shows the carrying handle 28 in the second end position 34. In order to reach the end position, the carrying handle 28 has been pivoted further out of the intermediate position 38. After pivoting past the intermediate position 38, the carrying handle 28 acts on the locking element 30 via the second driving stop 41 (FIG. 5) and drives the locking element 30. As a result, the locking element 30 is also pivoted. The locking element 30 is pivoted in the second end position 34 out of the region of the locking pin 32 and is no longer in engagement with the locking pin 32. As a result, the lid 23 can be pivoted away from the filling opening 27 (FIG. 16) of the container 7 in the second end position 34 of the carrying handle 28. As FIGS. 3 and 6 show, the lid 23 has moved upward in the direction of an arrow 44 during release of the locking action, that is, has moved away from the container 7. This movement of the lid 23 takes place on account of the elasticity of the seal 62 (FIG. 12). As an alternative, spring elements can also be provided, in order to move the lid 23 upward. The movement of the lid 23 takes place in the direction of the longitudinal direction 88 of the slots 37. As FIGS. 6 and 7 show, the bearing pin 36 is situated at the upper end of the slot 37 when the locking apparatus 29 is open and, as shown in FIGS. 3 and 4, is situated at the lower end of the slot 37 when the locking apparatus 29 is closed. The terms "upper" and "lower" relate here in each case to the direction of action 20 of gravity in the set-down position 21 of the sprayer 1. If the locking apparatus 29 is closed, the locking elements 30 engage onto the locking pins 32 and move the lid 23 downward counter to the direction of the arrow 44. The movement also takes place here as a translational movement in the longitudinal direction 88 of the slots 37. In order to close the locking apparatus 29, the carrying handle 28 is pivoted out of the carrying position 39 (shown in FIG. 7) into the end position 33 (shown in FIG. 3). After the carrying handle 28 has been pivoted by a predefined pivoting angle out of the carrying position 39, the carrying handle 28 comes into contact with the driving stop 40 (FIG. 5) and drives the locking element 30 via the driving stop 40. The locking element 30 latches with its latching elevation 42 under the locking pin 32 and locks the lid 23 on the container 7 as a result in the end position 33. As FIG. 6 also shows, the lid 23 has a depression 35, in which the carrying handle 28 is arranged in the first end position 33 (shown in FIG. 3).

In order to remove the lid 23 from the container 7, the carrying handle 28 can be pivoted into the carrying position 39 (shown in FIG. 7). Here, the carrying handle 28 can be pivoted in a certain angular range independently of the locking element 30, with the result that the locking apparatus 29 is not closed.

Figure 8:
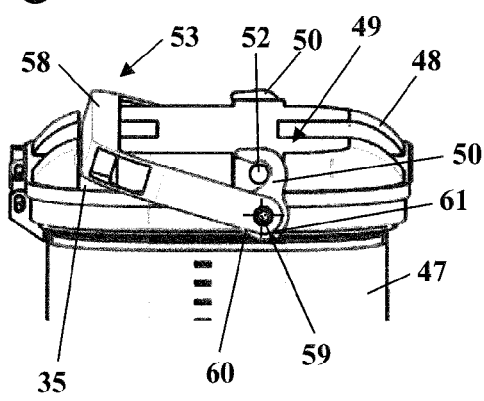
FIG. 8 is a perspective illustration of one embodiment of the container with a locked lid.
Figure 9:
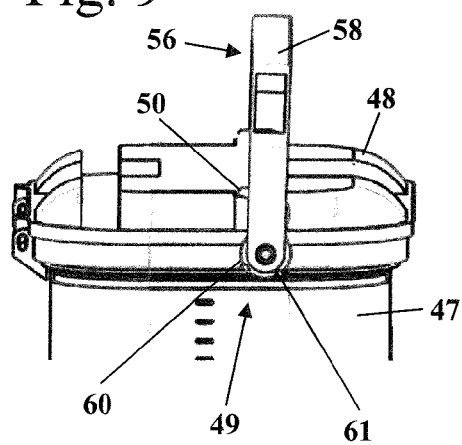
FIG. 9 shows the container from FIG. 8 with a locked lid in the carrying position of the carrying handle.
Figure 10:
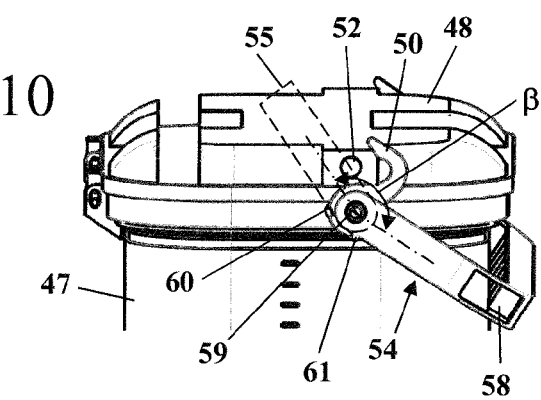
FIG. 10 shows the container from FIG. 8 with an open locking apparatus.

In the embodiment which is shown in FIGS. 3 to 7, the carrying handle 28 and the locking elements 30 are mounted on the lid 23, and the bearing pins 36 are fixed to the container 7. FIGS. 8 to 10 show one embodiment of a container 47, on which the lid 48 is arranged. The lid 48 is held on the container 47 via the locking apparatus 49. The locking apparatus 49 includes a carrying handle 58 which acts on locking elements 50 via driving stops 60 and 61. As FIG. 8 shows, two locking elements 50 are provided on opposite sides of the lid 48. The carrying handle 58 and the two locking elements 50 are mounted on the container 47 such that they can be pivoted about a pivot axis 59. The lid 48 has locking pins 52, onto which the locking elements 50 hook in the first end position 53 (shown in FIG. 8) of the carrying handle 58 and thus fix the lid 48 to the container 47. As FIG. 8 shows, the carrying handle 58 lies at least partially in a depression 35 of the lid 48 in its first end position 53.

FIG. 9 shows the carrying handle 58 in a carrying position 56. In this position, the carrying handle 58 protrudes approximately perpendicularly upward in the set-down position 21 of the sprayer 1 (FIG. 1). The carrying handle 58 is spaced apart both from the first driving stop 60 and from the second driving stop 61. Furthermore, the locking apparatus 49 is closed if the carrying handle 58 has been pivoted out of the first end position 53 into the carrying position 56.

Figure 16:
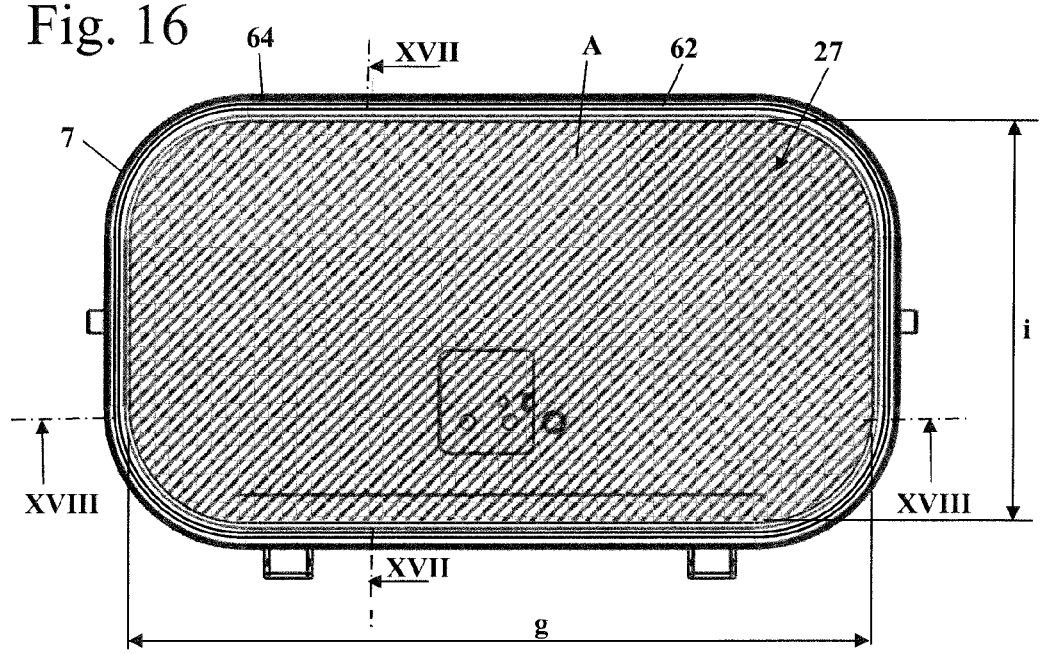
FIG. 16 shows a plan view of the container with a removed lid.

FIG. 10 shows the carrying handle 58 after further pivoting about the pivot axis 59. In the second end position 54 (shown in FIG. 10), the carrying handle 58 bears against a side wall of the container 47. The carrying handle 58 bears against the second driving stop 61 and has opened the locking apparatus 49 via the second driving stop 61 and the locking elements 50. The locking elements 50 are pivoted away from the locking pins 52 in comparison with the locked position (shown in FIGS. 8 and 9), with the result that the lid 48 can be pivoted away from the filling opening 27 (FIG. 16). The carrying handle 58 can be pivoted out of the second end position 54 (shown in FIG. 10) as far as into an intermediate position 55 which is shown using a dashed line, without acting on the locking elements 50. The angle β, about which the carrying handle 58 can be pivoted with respect to the locking elements 50, is advantageously at least approximately 90°, in particular more than approximately 110°. In the embodiment, the angle β is considerably more than 90°, preferably approximately from 130° to 160°. As a result, the carrying handle 58 can also be adjusted into the carrying position 56 (shown in FIG. 9) when the locking apparatus 49 is open.

As FIGS. 3 to 7 show for the first embodiment and FIGS. 8 to 10 show for the second embodiment, the carrying handle (28, 58) acts on the locking element (30, 50) in the pivoting path from the first end position (33, 53) into the second end position (34, 54) only after passing over the carrying position (39, 56). The carrying handle (28, 58) also acts on the locking element (30, 50) only after pivoting over the carrying position (39, 56) in the pivoting path from the second end position (34, 54) into the first end position (33, 53). As a result, the carrying handle (28, 58) can be set into the carrying position (39, 56) both when the locking apparatus (29, 49) is open and when the locking apparatus (29, 49) is closed.

Figure 11:
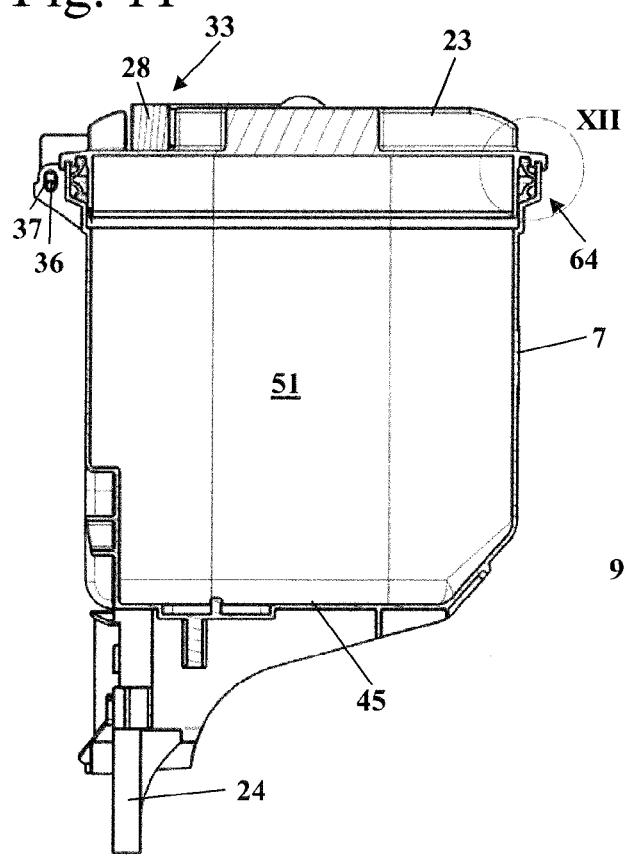
FIG. 11 shows a section through the container from FIG. 8.

FIGS. 11 to 15 show the configuration of the seal of the lid 23 with regard to the container 7 in detail. A corresponding seal can be provided for the container 47 and the lid 48. As FIG. 11 shows, the container 7 has an edge 64 which extends outward and upward from the container interior 51 in the set-down position 21. The container interior 51 is delimited toward the bottom by a bottom 45 of the container 7 in the set-down position 21. As FIG. 12 shows, the edge 64 has a receiving space 63 for a seal 62. In the embodiment, the seal 62 is held in a groove 68 on the lid 23. If the lid 23 is removed, the seal 62 is also removed. The edge 64 has a bottom 66 which falls away in the direction of the container interior 51. The bottom 66 is inclined by an angle γ with respect to a horizontal line 57. The angle γ is advantageously more than approximately 5°, in particular more than approximately 15°. The angle γ ensures that spraying agent which passes onto the bottom 66 of the edge 64 during filling can flow away or trickle down into the container interior 51. The horizontal line 57 is arranged horizontally, that is, parallel to the set-down surface 22 in the set-down position 21.

The bottom 66 is adjoined by a wall 65 which delimits the receiving space 63 radially to the outside, that is, on the side which faces away from the container interior 51. In the embodiment, the wall 65 is oriented approximately perpendicularly, that is, virtually parallel to the direction of action 20 of gravity in the set-down position 21 (FIG. 2). For manufacturing of the container 7 using injection molding, a slight inclination of the wall 65 is provided, in order to make it possible to demold the container 7. When the locking apparatus 29 is locked, the wall 65 is arranged with its upwardly protruding edge in a groove 67 of the lid 23, which axial groove 67 lies radially outside the groove 68. The receiving space 63 is delimited toward the container interior 51 by an edge 69 of the lid 23 which likewise runs circumferentially and approximately in the direction of action 20 of gravity, that is, approximately perpendicularly. The seal 62 has a holding section 72 which is arranged in the groove 68 of the lid 23. Moreover, the seal 62 has a lower sealing section 73 which bears against the bottom 66 of the receiving space 63 and on which an axial sealing face 71 is formed. The axial sealing face 71 acts at least partially in the direction of action 20 of gravity. A center section 90 of the seal 62 extends between the holding section 72 and the lower sealing section 73, in which center section 90 the seal 62 has a homogeneous, small thickness. The holding section 72 and the lower sealing section 73 are of thickened configuration with respect to the center section 90. The center section 90 has a radial sealing face 70 which bears against the wall 65 when the locking apparatus 29 is closed and seals the container interior 51 in a direction perpendicular with respect to the direction of action 20 of gravity. In the embodiment, the seal 62 has a second radial sealing face 91 which is formed on the lower sealing section 73 and which acts radially to the inside, that is, in the direction of the container interior 51 and bears against the edge 69 of the lid 23.

Figure 13:
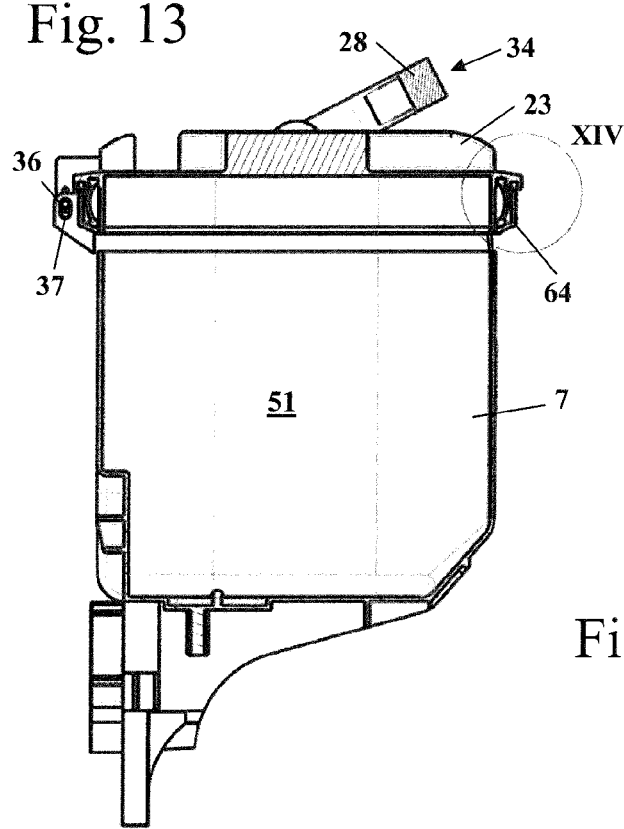
FIG. 13 shows the container from FIG. 11 in a sectional illustration with an open locking apparatus.
Figure 14:
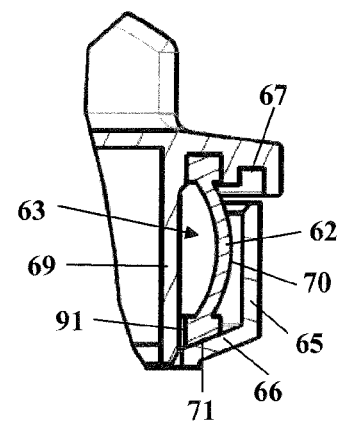
FIG. 14 shows the detail XIV from FIG. 13 in an enlarged illustration.

FIG. 13 shows the container 7 and the lid arranged thereon in the second end position 34 of the carrying handle 28. As the enlarged illustration in FIG. 14 shows, the axial sealing face 71 bears against the bottom 66 of the receiving space 63. The radial sealing face 70 is at a spacing from the wall 65, with the result that no sealing action yet takes place in the radial direction. The wall 65 is not arranged in the groove 67, but rather is at a spacing from the latter.

Figure 15:
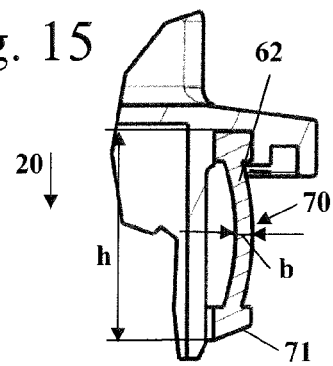
FIG. 15 shows a section through the lid in the region of the detail XIV, with the lid removed from the container.

FIG. 15 shows the seal 62 when the lid 23 is removed. In this non-loaded state, the seal 62 has a height (h) which is measured in the direction of action 20 of gravity. The seal 62 has a width (b) on the radial sealing face 70. The height (h) is considerably greater than the width (b). The width (b) is advantageously less than approximately 40%, in particular less than approximately 25% of the entire height (h) of the seal 62 in the non-loaded state. In the non-loaded state, the height (h) is preferably at least approximately 2.0 cm, in particular at least approximately 3.0 cm. As FIG. 15 shows, the seal 62 is also curved toward the outside in the non-loaded state, in order to ensure that the seal 62 does not curve toward the inside upon loading, but rather can bear against the wall 65 (FIG. 14). As FIG. 16 also shows, the seal 62 is configured as a circumferential sealing strip which is arranged circumferentially on the edge 64.

When the lid 23 is placed onto the container 7, the axial sealing face 71 bears against the bottom 66 of the edge 64. If the locking apparatus is closed, that is, for example, the carrying handle 28 is pivoted from the second end position 34 (shown in FIG. 13) into the first end position 33 (shown in FIG. 11), the locking apparatus 29 closes (FIG. 3). Here, the lid 23 moves in the longitudinal direction 88 of the slots 37 with respect to the container 7 (FIG. 4), and the bearing pins 36 move in the slots 37 out of the upper position (shown in FIG. 13) into the lower position (shown in FIG. 11). On account of the translational movement of the lid 23 perpendicularly with respect to the longitudinal direction of the seal 62, the seal 62 is compressed. Here, the seal 62 is deformed in its center section 90, and the radial sealing face 70 is pressed onto the wall 65. At the same time, the axial sealing face 71 is pressed against the bottom 66 and the second radial sealing face 91 is pressed against the edge 69. A reliable sealing action is achieved as a result. The seal 62 is advantageously configured in such a way that the axial sealing face 71 pushes spraying agent which is arranged on the bottom 66 of the receiving space 63 into the container interior 51 when the lid 23 is put on and when the locking apparatus 29 is closed.

Figure 17:
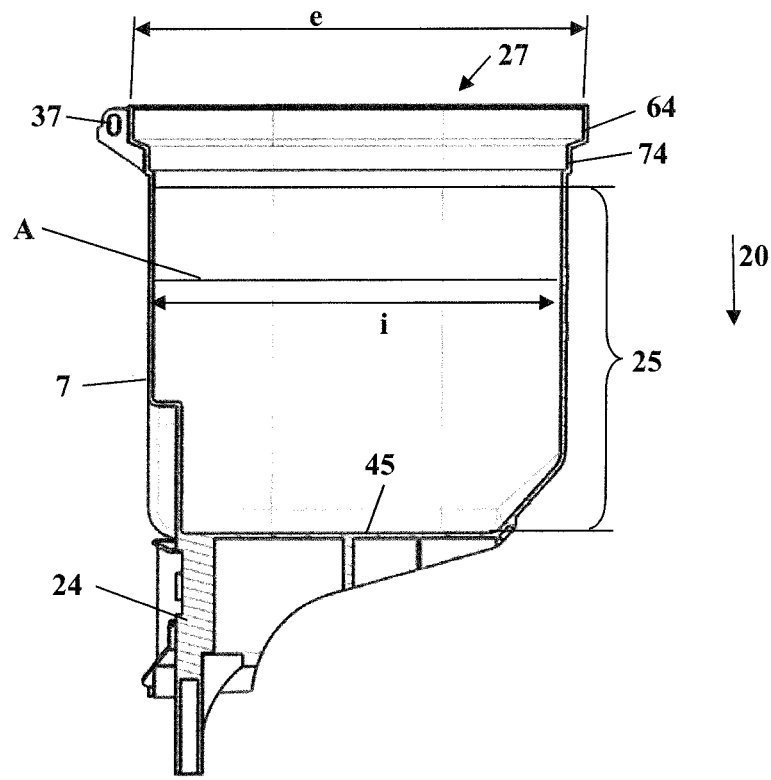
FIG. 17 shows a section along the line XVII-XVII in FIG. 16.

FIG. 16 shows the filling opening 27. The filling opening 27 extends over the entire inner cross section of the container 7. The container 7 has a greatest inner cross-sectional area A which is also shown in FIG. 17. In FIG. 16, the inner cross-sectional area A is indicated using hatched lines. The greatest inner cross-sectional area A is the greatest horizontal cross section of the container 7 in the spraying agent region 25 when the sprayer 1 is situated in the set-down position 21 (FIG. 2). The container 7 can advantageously be opened at the filling opening over at least 60% of the inner cross-sectional area A. The container can particularly advantageously be opened at the filling opening over at least 90% of its greatest inner cross-sectional area A. In the embodiment, the container can be opened at the filling opening over its entire greatest inner cross-sectional area A. In addition, the region of the edge 64 is also completely open toward the top. As a result, the container interior 51 (FIG. 13) is readily accessible for the user and the filling of spraying agent and the cleaning of the container 7 are simplified.

In an embodiment, the container 7 has a rounded rectangular cross section. The container 7 has a depth (i) which is measured perpendicularly with respect to the plane of the back plate 86 (FIG. 2) and is considerably smaller than a width (g) of the container 7, which width (g) is measured parallel with respect to the plane of the back plate 86. Here, the depth (i) and the width (g) are measured at the greatest inner cross-sectional area A, that is, in the spraying agent region 25, as FIGS. 17 and 18 also show. The depth (i) is advantageously from approximately 30% to approximately 70%, in particular from approximately 40% to approximately 60% of the width (g).

As FIG. 17 shows, the container 7 has an annular shoulder 74 on the side which faces the bottom 45 of the container 7, in which annular shoulder 74 the outer circumference of the container 7 is enlarged. As FIG. 17 shows, the depth of the container 7 increases from the bottom 45 in the direction of the filling opening 27, with the result that the container 7 does not have any undercuts. As FIG. 18 shows, the width (g) also increases from the bottom 45 in the direction of the filling opening 27, so that no undercuts arise here either.

The container 7 is configured as an injection-molded part, in particular made from plastic. The carrier 24 is formed integrally on the container 7. As FIG. 17 shows, the carrier 24 is arranged on the bottom 45 of the container 7. The carrier 24 has two arms 94 which each have a multiplicity of reinforcing ribs. The two arms 94 are arranged on both sides of connector stubs 75, 76 and 77 of the container 7. The arms 94 can be plugged into receptacles of the back carrier 2, in order to fix the container 7 on the back carrier 2. FIG. 18 also shows connector stubs 75 to 77 which are formed integrally on the container 7. The connector stub 75 is provided for connecting the spraying agent line 8 or a feed line to a pressure pump. A further connector stub 76 is provided for connecting a ventilating line and the third connector stub 77 is provided for connecting a return line for the pressure pump. The connector stub 77 can be closed during operation without a pressure pump.

Figure 18:
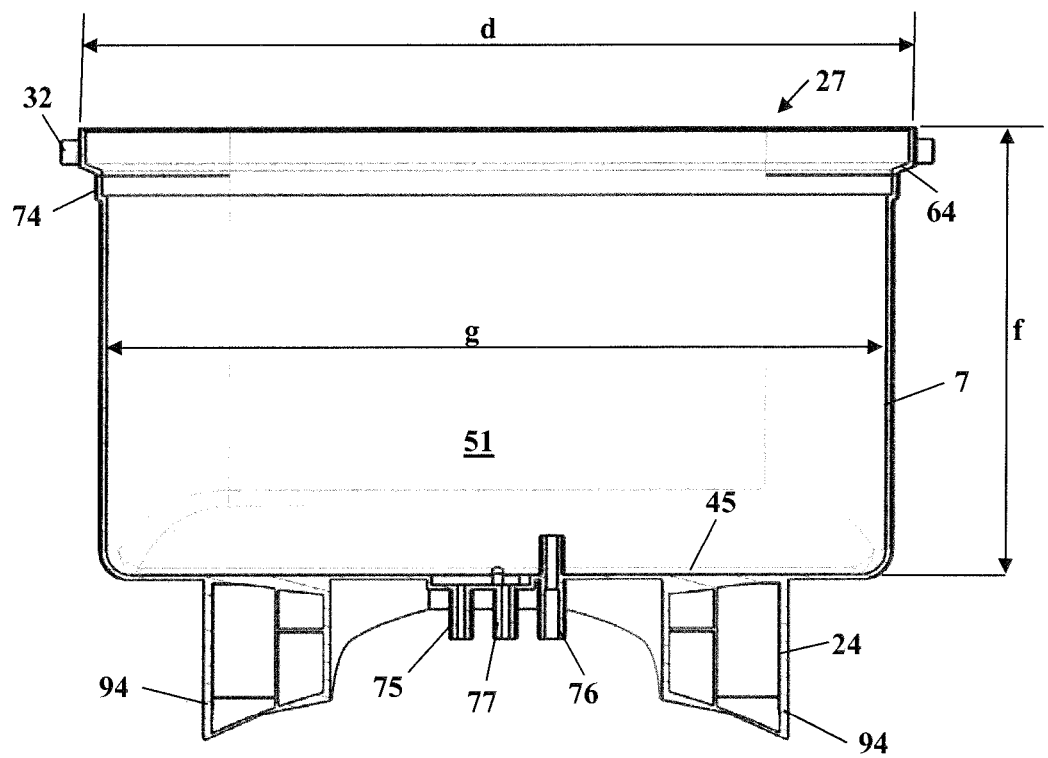
FIG. 18 shows a section along the line XVIII-XVIII in FIG. 16.

As FIGS. 17 and 18 show, the container 7 is of approximately cuboid configuration with rounded edges and corners. The container 7 has a height (f) which is measured from the bottom 45 as far as the filling opening 27. Here, the carrier 24 and the connector stubs 75 and 77 which protrude out of the container 7 are not included in the measurement. The container 7 has the width (d) which is measured at the filling opening 27. Here, the locking pins 32 are not included in the measurement. As FIG. 17 shows, the container 7 has a depth (e). The elements of the pivoting bearing 31 are not included in the measurement of the depth (e). The width (g), height (f) and depth (e) of the container 7 are measured in those regions of the container 7 which delimit the container interior 51. The height (f) and the depth (e) can be approximately of equal magnitude. The height (f) is advantageously from approximately 75% to approximately 1250 of the depth (e). The width (d) is considerably greater than the depth (e) and the height (f). The height (f) and the depth (e) can advantageously be from approximately 40% to approximately 70% of the width (d).

Figure 19:
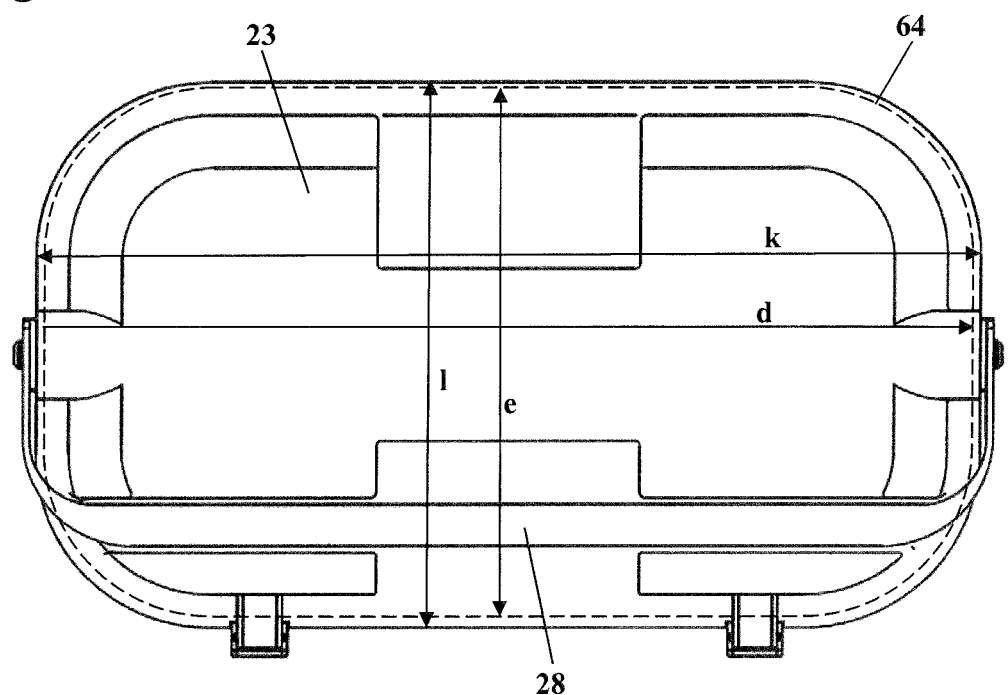
FIG. 19 shows a view from above of the lid of the container.

FIG. 19 shows the lid 23 from above. The course of the edge 64 is illustrated using a dashed line. In the same way as the container 7, the lid 23 has a rounded rectangular cross section. As FIG. 17 shows, the lid 23 extends at every location beyond the edge 64. If the lid 23 is removed, the container 7 is open toward the top over its entire inner cross section including the region of the edge 64. Here, the outer contour of the lid 23 corresponds to the shape of the container cross section at the edge 64. The lid 23 has a width (k) which is measured parallel to the width (d) of the container 7 and is slightly greater than the width (d) of the container 7. The depth (1) of the lid 23 which is measured parallel to the depth (e) is likewise slightly greater than the depth (e) of the container 7.

Figure 20:
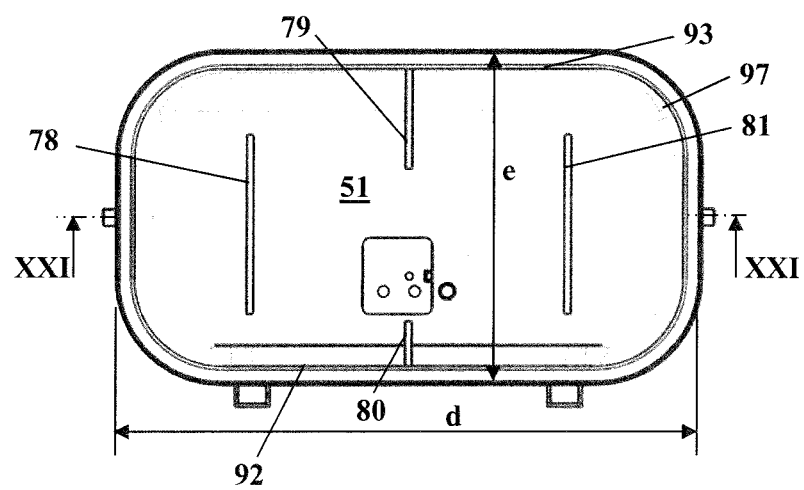
FIG. 20 shows a view from above of one embodiment of the container.
Figure 21:
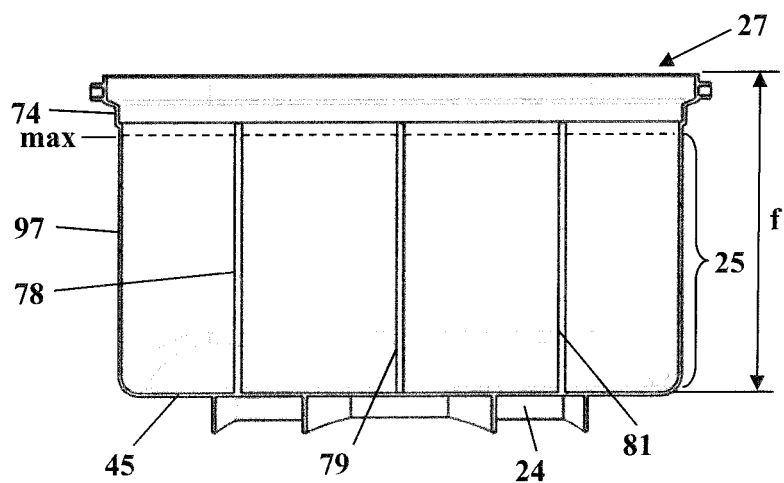
FIG. 21 shows a section along the line XXI-XXI in FIG. 20.

FIGS. 20 and 21 show an embodiment of a container 97. In order to avoid an excessive movement of the spraying agent in the container 97, in particular in the case of liquid spraying agent, the container 97 has baffles 78, 79, 80 and 81. The baffles 78 to 81 extend from the bottom 45 advantageously as far as at least the maximum permissible filling level max. In the embodiment, the baffles 78 to 81 extend as far as the lower edge of the annular shoulder 74. As FIG. 20 shows, the baffles 78 to 81 in each case extend only over a part region of the depth (e) of the container 97 at the filling opening 27. The baffles 78 and 81 extend in a middle region of the depth (e) of the container 97. The baffles 79 and 80 are arranged in one plane in a middle region of the width (d) and are at a spacing from one another. The baffle 79 adjoins a front wall 93 of the container 97, and the baffle 80 adjoins a rear wall 92. Here, the rear wall 92 is that wall of the container 97 which faces the back carrier 2 and the front wall 93 is the wall which faces away from the back carrier 2.

Figure 22:
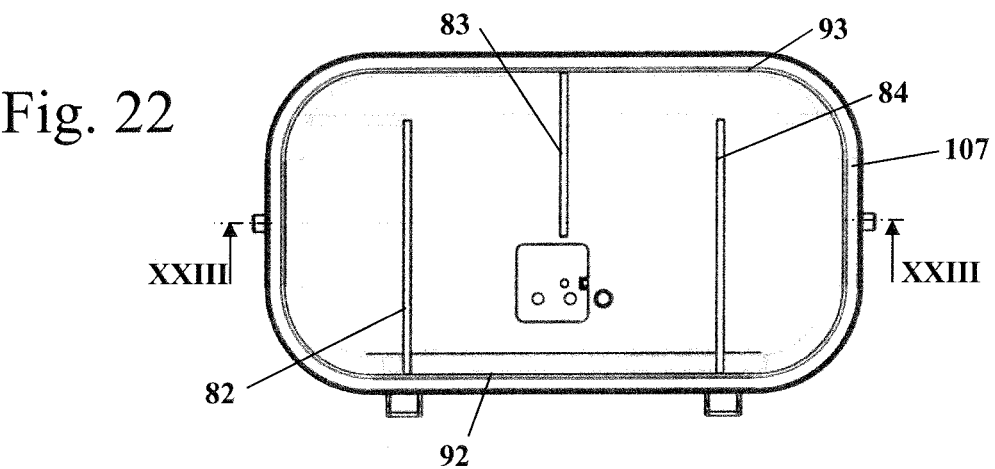
FIG. 22 shows a view from above of one embodiment of a container.
Figure 23:
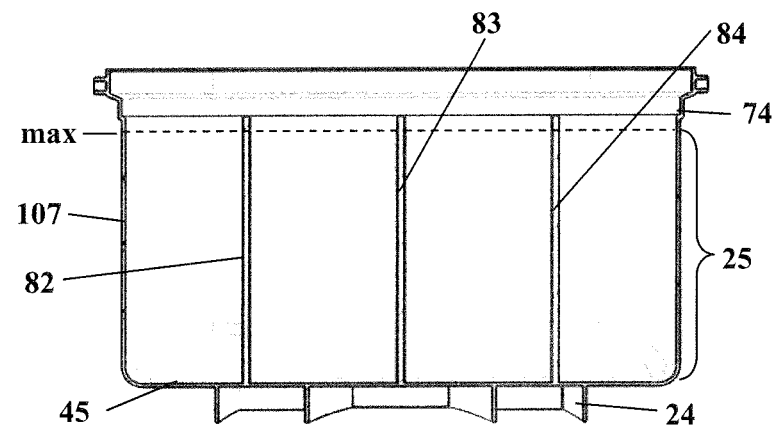
FIG. 23 shows a section along the line XXIII-XXIII in FIG. 22.

A further embodiment for baffles 82 to 84 of the container 107 is shown in FIGS. 22 and 23. Two outer baffles 82 and 84 are provided which extend from the rear wall 92 over a large part of the depth (e) of the container 107. A middle baffle 83 extends from the front wall 93 over a large part of the depth (e). The baffle 83 is at a spacing from the rear wall 92, and the baffles 82 and 84 are at a spacing from the front wall 93. As FIG. 23 shows, the baffles 82, 83 and 84 extend from the bottom 45 beyond the maximum filling height max as far as the lower edge of the annular shoulder 74. A different number and/or arrangement of baffles can also be advantageous.

In all figures, identical designations denote elements which correspond to one another. The containers 47, 97 and 107 are configured in accordance with the container 7 in terms of the features which are not described in detail.

It is understood that the foregoing description is that of the preferred embodiments of the invention and that various changes and modifications may be made thereto without departing from the spirit and scope of the invention as defined in the appended claims.

What is claimed is:

1. A back carried spray apparatus comprising:
    a container for spraying agent;
    said container having a fill opening;
    a cover configured to close said fill opening;
    the back carried spray apparatus defining a rest position wherein the spray apparatus is placed on an even horizontal rest surface;
    said container having a spray agent region extending up to a maximum allowable fill height;
    said spray agent region defining a greatest horizontal inner cross-sectional area (A) in said rest position; and,
    said container being configured to open over at least 60% of said greatest horizontal inner cross-sectional area (A) at said fill opening;
    a seal configured to act between said cover and said container;
    said seal being arranged in a receiving space defined between said cover and said container when said cover is closed;
    wherein said seal is held on said cover;
    said seal has an axial sealing surface; and,
    said container defines a container interior and has a circumferential rim sloping down to said container interior so as to permit the spraying agent to flow off away from the region of said rim into said container interior.

2. The spray apparatus of claim 1, wherein said container is configured to open over the entirety of said greatest horizontal inner cross-sectional area (A) at said fill opening.

3. The spray apparatus of claim 1, wherein said fill opening has a non-circular cross-section.

4. The spray apparatus of claim 1 further comprising:
    a locking arrangement configured to fix said cover on said container;
    said locking arrangement having a pivotably mounted locking element and a pivotable actuating element;
    said locking element being configured to effect a locking action; and,
    said locking arrangement being configured to lock and to release as a result of a pivoting of said actuating element.

5. The spray apparatus of claim 4, wherein said actuating element is pivotable relative to said locking element.

6. The spray apparatus of claim 4, wherein:
said actuating element has a first end position wherein said locking arrangement is closed; and,
said actuating element has a second end position wherein said locking arrangement is open.

7. A back carried spray apparatus comprising:
a container for spraying agent;
said container having a fill opening;
a cover configured to close said fill opening;
the back carried spray apparatus defining a rest position wherein the spray apparatus is placed on an even horizontal rest surface;
said container having a spray agent region extending up to a maximum allowable fill height;
said spray agent region defining a greatest horizontal inner cross-sectional area (A) in said rest position;
said container being configured to open over at least 60% of said greatest horizontal inner cross-sectional area (A) at said fill opening;
a locking arrangement configured to fix said cover on said container;
said locking arrangement having a pivotably mounted locking element and a pivotable actuating element;
said locking element being configured to effect a locking action;
said locking arrangement being configured to lock and to release as a result of a pivoting of said actuating element;
said actuating element has a first end position wherein said locking arrangement is closed;
said actuating element has a second end position wherein said locking arrangement is open;
a pivotably mounted carrying handle which forms said actuating element;
said carrying handle defining a pivot path between said first end position and said second end position; and,
said carrying handle further having a carrying position lying in said pivot path between said first end position and said second end position.

8. The spray apparatus of claim 7, wherein said carrying handle is configured to act on said locking element only after pivoting beyond said carrying position during a pivot movement along said pivot path from one of said first and second end positions to the other of said first and second end positions.

9. The spray apparatus of claim 7, wherein:
said cover has a recess foamed therein; and,
said carrying handle lies at least partially in said recess when in said first end position.

10. The spray apparatus of claim 1 further comprising:
a pivot bearing;
said cover being pivotably mounted on said container via said pivot bearing; and,
said pivot bearing being configured to allow a translational movement of said cover perpendicular to said fill opening.

11. The spray apparatus of claim 4, wherein:
said actuating element has a first end position wherein said locking arrangement is closed;
said actuating element has a second end position wherein said locking arrangement is open;
said fill opening defines a plane extending thereacross; and,
said locking arrangement is configured to impart a translational movement to said cover perpendicular to said plane when said actuating element is moved from said second end position to said first end position thereof.

12. The spray apparatus of claim 4, wherein:
said seal defines a radial sealing surface configured to act between said cover and said container;
said fill opening defines a plane;
said actuating element has a first end position wherein said locking arrangement is closed;
said actuating element has a second end position wherein said locking arrangement is open;
said locking arrangement being configured to impart a translational movement to said cover perpendicular to said plane when said actuating element is moved from its second end position to its first end position; and,
said radial sealing surface being configured to come into contact engagement with said container as a result of said translational movement.

13. The spray apparatus of claim 1, wherein:
said seal has a radial sealing surface;
said container has an outer side and a wall delimiting said receiving space to said outer side of said container; and,
said radial sealing surface is supported on said wall when said cover is closed.

14. The spray apparatus of claim 1, wherein:
said seal has a total height (h) in an unloaded state; and,
said axial sealing surface has a width (b) of less than approximately 40% of said total height (h).

15. The spray apparatus of claim 1, wherein:
said cover has an edge delimiting said receiving space to said container interior.

16. The spray apparatus of claim 1, wherein:
said seal is configured as a circumferential sealing band having a height (h) of at least approximately 2 cm in an unloaded state.

17. The spray apparatus of claim 1, wherein said seal is configured as a circumferential sealing band having a height (h) of at least approximately 3 cm in an unloaded state.

18. The spray apparatus of claim 1 further comprising:
a carrying arrangement having a back carrier; and,
a fastening arrangement formed on said container and configured to fix said container to said back carrier.

19. The spray apparatus of claim 1, wherein said cover is an injection molded part.

20. A container for spraying agent for a back carried spray apparatus, the container comprising:
a container body having a fill opening;
a cover configured to close said fill opening;
said container body having a spray agent region for spraying agent extending up to a maximum allowable fill height (max);
said spray agent region having a greatest horizontal inner cross-section (A) in a rest position of the spray apparatus; and,
said container body being configured to open over at least 60% of said greatest horizontal inner cross-section (A) at said fill opening;
a locking arrangement configured to fix said cover on said container;
said locking arrangement having a pivotably mounted locking element and a pivotable actuating element;
said locking element being configured to effect a locking action;
said locking arrangement being configured to lock and to release as a result of a pivoting of said actuating element;
said actuating element has a first end position wherein said locking arrangement is closed;

said actuating element has a second end position wherein said locking arrangement is open;

a pivotably mounted carrying handle which forms said actuating element;

said carrying handle defining a pivot path between said first end position and said second end position; and, said carrying handle further having a carrying position lying in said pivot path between said first end position and said second end position.

* * * * *